US009502775B1

(12) United States Patent
Gummalla et al.

(10) Patent No.: US 9,502,775 B1
(45) Date of Patent: Nov. 22, 2016

(54) SWITCHING A SLOT ANTENNA

(71) Applicant: GOOGLE INC., Mountain View, CA (US)

(72) Inventors: Ajay Chandra Venkata Gummalla, Sunnyvale, CA (US); Huan Liao, Mountain View, CA (US)

(73) Assignee: Google Inc., Mountain View, CA (US)

( * ) Notice: Subject to any disclaimer, the term of this patent is extended or adjusted under 35 U.S.C. 154(b) by 85 days.

(21) Appl. No.: 14/254,546

(22) Filed: Apr. 16, 2014

(51) Int. Cl.
*H01Q 13/10* (2006.01)
*H04B 1/401* (2015.01)

(52) U.S. Cl.
CPC .............. *H01Q 13/10* (2013.01); *H04B 1/401* (2013.01)

(58) Field of Classification Search
CPC .............................. H01Q 13/10; H01Q 1/243
See application file for complete search history.

(56) References Cited

U.S. PATENT DOCUMENTS 4,392,139 A * 7/1983 Aoyama .............. H01Q 25/002 343/705
5,754,143 A * 5/1998 Warnagiris ............... H01Q 1/36 343/746
2003/0122721 A1* 7/2003 Sievenpiper ............. H01Q 9/14 343/767
2006/0044200 A1* 3/2006 Mori ...................... H01Q 19/30 343/770
2006/0079177 A1* 4/2006 Okubora .................. H01Q 1/24 455/25
2007/0002805 A1* 1/2007 Laurila .................. H01Q 1/246 370/337
2014/0049432 A1* 2/2014 Hill ........................ H01Q 1/243 343/702

* cited by examiner

*Primary Examiner* — David Bilodeau
(74) *Attorney, Agent, or Firm* — Brake Hughes Bellermann LLP

(57) ABSTRACT

A computing device may include a conductive member, a slot antenna having a slot defined by the conductive member and an antenna pattern portion disposed proximate to the slot, and/or a slot switch configured to switch a portion of the slot. The slot switch may have a first terminal and a second terminal such that the portion of the slot is disposed between the first terminal and the second terminal. The slot switch may be switchable between a first configuration in which the first and second terminals are electrically connected and a second configuration in which the first and second terminals are not electrically connected. The computing device may also include a switching controller configured to switch the slot switch between the first and second configurations.

14 Claims, 5 Drawing Sheets

SWITCHING A SLOT ANTENNA

BACKGROUND

A slot antenna typically includes a metal surface, usually a flat plate, with a hole or a slot cut out. When the plate is driven as an antenna by a driving source at the resonant frequency, the slot radiates electromagnetic waves in a similar way to a dipole antenna. Generally, the shape and size of the slot, as well as the driving frequency, determine the radiation distribution pattern. Computing devices such as laptops have incorporated slot antennas with various antenna patterns into their design. However, slot antennas within computing devices are relatively small, and therefore accommodating a range of different frequencies may be difficult and challenging.

SUMMARY

The details of one or more implementations are set forth in the accompanying drawings and the description below. Other features will be apparent from the description and drawings, and from the claims.

In a general embodiment, a computing device may include a conductive member, a slot antenna having a slot defined by the conductive member and an antenna pattern portion disposed proximate to the slot, and/or a slot switch configured to switch a portion of the slot. The slot switch may have a first terminal and a second terminal such that the portion of the slot is disposed between the first terminal and the second terminal. The slot switch may be switchable between a first configuration in which the first and second terminals are electrically connected and a second configuration in which the first and second terminals are not electrically connected. The computing device may also include a switching controller configured to switch the slot switch between the first and second configurations.

In some embodiments, the computing device may include one or more of the following features, or any combination of the following features. The computing device may include an excitation point configured to transfer wireless signals between the slot antenna and a transceiver circuitry of the computing device, where the slot switch is disposed across the portion of the slot between a closed end portion of the slot and the excitation point. The computing device may include a secondary antenna pattern portion disposed proximate to the slot, and a secondary slot switch configured to switch a secondary portion of the slot. The secondary slot switch may have a first terminal and a second terminal such that the secondary portion of the slot is disposed between the first terminal of the secondary slot switch and the second terminal of the secondary slot switch. The secondary slot switch may be switchable between a first configuration in which the first and second terminals of the secondary slot switch are electrically connected and a second configuration in which the first and second terminals of the secondary slot switch are not electrically connected. The slot switch may be disposed across the portion of the slot between an open end portion of the slot and the excitation point. The computing device may include a secondary antenna pattern portion disposed proximate to the slot, and an antenna switch configured to switch the secondary antenna pattern portion. The antenna switch may have a first terminal and a second terminal. The first terminal may be connected to the secondary antenna pattern portion, the second terminal may be connected to a ground contact of the computing device, and the antenna switch may be switchable between a first configuration in which the first and second terminals are electrically connected and a second configuration in which the first and second terminals are not electrically connected. The computing device may include a band detector configured to detect an operating frequency of the computing device, where the switching controller is configured to tune the slot antenna to the detected operating frequency by determining and transmitting a switch control signal to the slot switch. The switch control signal may cause the slot switch to switch to the first configuration or the second configuration. The switching controller may be configured to control the operation of the slot switch based on switch mapping information. The switch mapping information may indicate a plurality of states, and for each state, map at least one frequency to a configuration of the slot switch.

In a general embodiment, a computing device may include a conductive member, a slot antenna having a slot defined by the conductive member and an antenna pattern portion disposed proximate to the slot, and/or an antenna switch configured to switch the antenna pattern portion. The antenna switch may have a first terminal coupled to the antenna pattern portion and a second terminal coupled to a ground contact. The antenna switch may be switchable between a first configuration in which the first and second terminals are electrically connected and a second configuration in which the first and second terminals are not electrically connected. The computing device may include a switching controller configured to switch the antenna switch between the first and second configurations.

In some embodiments, the computing device may include one or more of the following features, or any combination of the following features. The computing device may include an excitation point configured to transfer wireless signals between the slot antenna and a transceiver circuitry of the computing device, where the antenna switch is disposed between the excitation point and an open end portion of the slot. The computing device may include a band detector configured to detect an operating frequency of the computing device. The switching controller may be configured to tune the slot antenna to the detected operating frequency by determining and transmitting a switch control signal to the antenna switch, where the switch control signal may cause the antenna switch to switch to the first configuration or the second configuration. The switching controller may be configured to control the operation of the antenna switch based on switch mapping information. The switch mapping information may indicate a plurality of states, and for each state, map at least one frequency to a configuration of the antenna switch.

In a general embodiment, a computing device may include a conductive member, a slot antenna having a slot defined by the conductive member and an antenna pattern portion disposed proximate to the slot, and/or a switch configured to switch the slot or the antenna pattern portion. The switch may be switchable between a first configuration in which first and second terminals of the switch are electrically connected and a second configuration in which the first and second terminals of the switch are not electrically connected. The computing device may include a switching controller configured to switch the switch between the first and second configurations.

In some embodiments, the computing device may include one or more of the following features, or any combination of the following features. The switch may be configured to switch the slot such that a portion of the slot is disposed between the first terminal and the second terminal of the switch. The switch may be configured to switch the antenna pattern portion such that the switch does not extend over the slot. The first terminal may be connected to the antenna pattern portion. The second terminal may be connected to a ground contact. The computing device may include a plurality of switches including the switch. Each of the plurality of switches may be configured to switch the slot or the antenna pattern portion. The computing device may include an excitation point disposed between an open end portion and a closed end portion of the slot. The excitation point may be configured to transfer wireless signals between the slot antenna and a transceiver circuitry of the computing device. The antenna pattern portion may be coupled to the excitation point.

In a general embodiment, a method of adjusting a frequency band of a slot antenna on a computing device may include detecting an operational frequency of the slot antenna. The slot antenna may have a slot defined by a conductive member of the computing device and an antenna pattern portion. The method may include determining a switch control signal for a switch configured to switch the slot or the antenna pattern portion based on switch mapping information and the detected operational frequency, and switching between a first configuration in which first and second terminals of the switch are electrically connected and a second configuration in which the first and second terminals of the switch are not electrically connected based on the switch control signal such that a frequency of the slot antenna is shifted.

In some embodiments, the method may include one or more of the following features, or any combination of the following features. The switch mapping information may indicate a plurality of states, and for each state, map at least one frequency to a configuration of the switch. A portion of the slot may be disposed between the first terminal and the second terminal.

DETAILED DESCRIPTION

Figure 1:
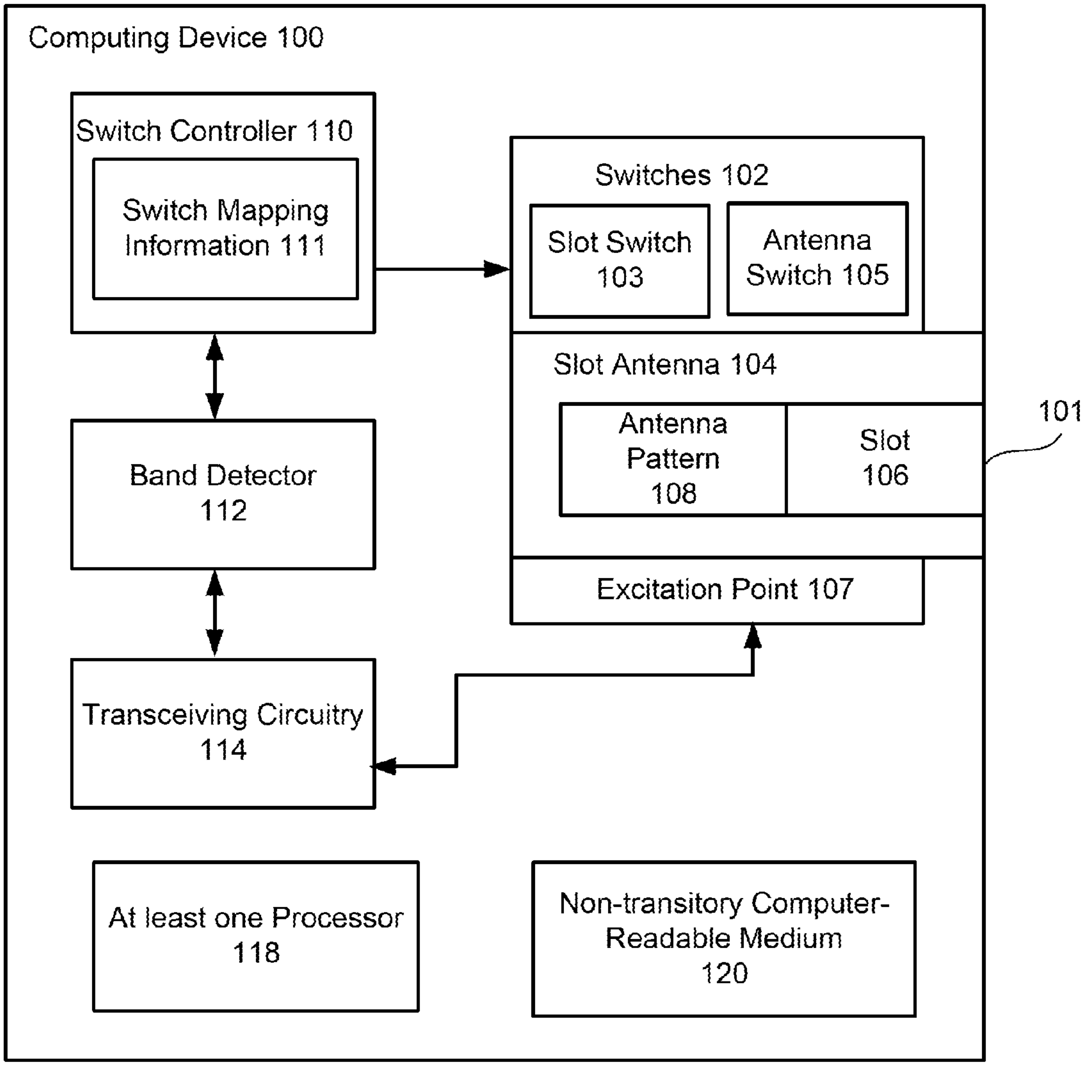
FIG. 1 illustrates an example of a computing device having a slot antenna with one or more switches according to an embodiment.

Embodiments provide a slot antenna that is defined by at least a portion of a conductive frame or housing of a computing device. For example, the slot antenna may include a slot defined by the conductive frame of the computing device and an antenna pattern that causes a frequency resonance within the slot antenna. According to the embodiments, a switching mechanism (e.g., one or more switches) may be coupled to the slot antenna such that the switching mechanism can effectively switch the slot and/or the antenna pattern between two or more different configurations, thereby adjusting the resonant frequency of the slot antenna which adjusts the operating frequency of the computing device. In contrast, some conventional approaches may adjust the impedance matching of the antenna elements using a tunable circuit.

In some examples, the switches may include one slot switch or multiple slot switches disposed along a length of the slot. Each slot switch may be configured to switch the slot between two or more different configurations to adjust the resonant frequency of the slot antenna. For example, the slot may be disposed between a first terminal and a second terminal of a respective switch. When the slot switch is in the closed position, the first terminal is electrically connected to the second terminal (e.g., the slot switch connects two sides of the slot), thereby adjusting the effective length of the slot on which the resonant frequency of the antenna depends. When the slot switch is in the open position, a connection is not made between the first terminal and the second terminal, thereby allowing the signals to resonate though the open slot switch.

In some examples, when two or more slot switches are used, the slot switches may include two classifications of slot switches, e.g., one or more low band slot switches and one or more high band slot switches. The classification of a particular slot switch may depend on its location with respect to an excitation point (or feed point) of the slot antenna. For example, one or more slot switches that are disposed over the slot between the excitation point and the closed end portion of the slot may be referred to as the low band switches because they shift the low band resonance of the slot antenna. One or more slot switches that are disposed over the slot between the excitation point and the open end portion of the slot may be referred to as the high band slot switches because they shift the high band resonance of the slot antenna.

In some examples, the switches may include one or more antenna switches. For example, an antenna switch is configured to switch an antenna pattern between two or more different configurations to adjust the resonant frequency of the slot antenna. For example, with respect to a particular antenna pattern, a first terminal may be connected to the antenna pattern and a second terminal may be connected to a ground contact (e.g., without the switch being disposed across the slot). The operation of the antenna switch (e.g., moving from the open position to the closed position or vice versa) may shift the resonant frequency of the slot antenna.

The slot antenna incorporated with the switching mechanism described herein can provide the computing device with a wide range of frequencies or frequency bands that may be used by the computing device. As such, the computing device can use the slot antenna to wirelessly communicate using different wireless standards or protocols that operate using different frequencies or frequency bands, and dynamically switch between the various frequencies or frequency bands. In a non-limiting example, the computing device can wirelessly communicate according to a first frequency band range (e.g., 700 MHz, 800 MHz, 1700-2100 MHz), switch to a second frequency (900 MHz), switch to a third frequency (2600 MHz), and so forth, by controlling the operation of the switching mechanism that effectively switches the slot and/or the antenna pattern. Also, as further explained below, the design(s) of the switching-based slot antenna facilitates adjustment of the granularity of the various frequency bands, as well covering various different frequencies used for wireless communication.

According to another aspect, the switching mechanism may be controlled by a switch controller that is configured to determine the appropriate signals for the switching mechanism. In one example, a band detector may detect a current operating condition of the computing device. For example, the band detector may detect the computing device's operating frequency, frequency band, and/or current operating channel. Then, based on the detected operating condition, the switching controller may determine a switch control signal for the switching mechanism in order to tune the slot antenna to a frequency/frequency band that corresponds to the detected operating condition. These and other features are further explained with reference to the figures.

FIG. 1 illustrates an example of a computing device 100 having a slot antenna 104 with one or more switches 102 according to an embodiment. The computing device 100 may include any type of device having a slot antenna for wireless communication, such as, laptops, netbooks, mobile phones, smartphones, desktop computers, or tablets, etc., for example. The computing device 100 may include at least one processor 118 and a non-transitory computer readable medium 120 that stores instructions executable by the at least one processor 118 for performing the functionalities/operations of the computing device 100 as discussed herein. The at least one processor 118 may be one or more circuits or devices attached to a semiconductor substrate(s).

The slot antenna 104 may include a slot 106 defined by a conductive frame 101 of the computing device 100, an antenna pattern 108 (e.g., a physical geometry of electrical components of the antenna), and an excitation point 107. In some examples, the slot 106 may be defined by any conductive member of the computing device 100 (e.g., not necessarily the conductive frame 101). Generally, the slot antenna 104 may and/or receive wireless signals such that the computing device 100 may wirelessly communicate with another device. In some examples, the slot antenna 104 may be a quarter wavelength slot antenna. The slot antenna 104 may transmit wireless signals over a number of frequencies or frequency bands associated with a number of different wireless communication standards or protocols by dynamically switching the slot 106 and/or the antenna pattern 108, as further described below.

The conductive frame 101 may be referred to as a housing or chassis, and maybe be constructed with any type of conductive materials such as a metal-based material (e.g., aluminum, magnesium, alloy, titanium, etc.). The conductive frame 101 may be the structural framework on which electrical components or circuitry is mounted. As such, the shape and type of the conductive frame 101 may vary widely depending on the type of computing device 100. In some examples, the slot 106 may be a channel or cavity that extends into the conductive frame 101. In some examples, the slot 106 may be a cut into the conductive frame 101. In some examples, the slot 106 may have an open end and a closed end. In other words, the slot 106 of the slot antenna 104 may be defined by the conductive frame 101. In some examples, the slot 106 may include or be filled with an insulator material such as any type of dielectric material. The insulator material may extend through at least a portion of the slot 106 or the slot 106 in its entirety.

In some examples, the slot 106 may include an open end portion that defines an opening into the conductive frame 101 and a closed end portion that defines the end of the slot 106 within the conductive frame 101. The slot 106 may have a length extending from the opening of the conductive frame 101 to the portion of the conductive frame 101 where the slot 106 ends. In some examples, the opening to the slot 106 may be visible on the exterior of the conductive frame 101 or may be included as part of a logo or other design of the computing device 100. The width and length of the slot 106 may depend on the type of computing device 100. In some examples, the width of the slot 106 may be less than 2.0 mm. In other examples, the width of the slot 106 may be greater or equal to 2.0 mm. Also, the slot 106 may be one or a combination of different cavity shapes such as substantially linear, curved, L-shaped, or spiral-shaped, or generally any type of cavity shape that is formed by the conductive frame 101.

In addition, the slot 106 may be defined on any portion of the conductive frame 101. With respect to a laptop implementation, the conductive frame 101 may include a portion of the conductive frame 101 above or behind the display screen or the rear lid (also know as an "A-case"), a portion of the conductive frame 101 in front of or in the same side as the display screen (also know as an "B-case"), a portion of the conductive frame 101 related to a keyboard side of a base portion (also know as an "C-case"), and a portion of the conductive frame 101 related to bottom of the base portion (opposite to the keyboard side) (also know as an "D-case"). The slot 106 may be defined on any portion of the conductive frame 101 such as the A-case, B-case, C-case, D-case, or any portions of the conductive frame 101 that extend between these portions. In addition, the computing device 100 may include a plurality of slots 106 that are defined at various locations on the conductive frame 101.

The antenna pattern 108 may include a conductive material such as any type of metal-based material, for example. In some examples, the antenna pattern 108 may be constructed of the same type of metal or conductive material as the conductive frame 101 defining the slot antenna 104. When driven by a driving frequency, the antenna pattern 108 in conjunction with the slot 106 may create a frequency resonance that falls within one or more frequencies. For example, the shape/length of the antenna pattern 108 in conjunction with the dimensions of the slot 106 may determine the resonant frequency associated with the slot antenna 104. In some embodiments, the antenna pattern 108 may include one continuous antenna pattern, multiple distinct antenna pattern portions, or multiple antenna pattern portions formed as part of an overall antenna pattern structure. The structure of each antenna pattern portion may be a variety of shapes and lengths which may be the same or different from each other. Each antenna pattern portion can be referred to as an antenna arm or antenna branch that is separately constructed or part of an overall antenna pattern.

Each antenna pattern portion may be disposed proximate to the slot 106 such that an antenna pattern portion is not physically coupled to the slot but is capacitively coupled to the slot 106. In this context, the antenna pattern portions may be separated from the slot 106 by one or more insulating layers being composed of any type of dielectric material. In other words, each antenna pattern portion may be formed on, within, or by the conductive frame 101 of the computing device 100 in a location that is proximate to the slot 106 with the appropriate intervening insulation layer(s) in order to create a capacitive coupling between an antenna pattern portion and the slot 106. In some examples, the antenna pattern portions may be disposed in the same plane with respect to each other (or different planes), and may be disposed in a separate plane than the slot 106.

In some examples, the antenna pattern 108 may include a first antenna pattern portion and a second antenna pattern portion. In some examples, the first antenna pattern portion may be a component separate from the second antenna pattern portion. In other examples, the first antenna pattern portion and the second antenna pattern portion may be formed as parts of the same antenna pattern structure but represent different portions of the antenna structure. In some examples, the first antenna pattern portion may be associated with a low band resonant frequency such that the first antenna pattern portion in conjunction with the slot 106 may generate a low band resonant frequency, and the second antenna pattern portion may be associated with a high band resonant frequency such that the second antenna pattern portion in conjunction with the slot 106 may generate a high band resonant frequency that is higher than the low band resonant frequency. In some examples, the second antenna pattern portion may be referred to as a parasitic arm. In some examples, the second antenna pattern portion may be placed near the high electric field area of the slot 106 (which may be proximate to the opening of the conductive frame 101).

The excitation point 107 may be configured to transfer electrical signals (to be transmitted by the slot antenna 104 or received from the slot antenna 104) between the slot antenna 104 and a transceiving circuitry 114 included within the computing device 100. The transceiving circuitry 114 may be internal circuit component(s) that are configured to process wireless signals to/from the slot antenna 104. In some examples, the excitation point 107 may be considered the feed point between the transceiving circuitry 114 and the slot antenna 104, and the excitation point 107 and the transceiving circuitry 114 may be connected via any type of connection technique such as a cable or wire(s). In some examples, one or more of the antenna pattern portions may be excited by an electrical signal from the excitation point 107 which then causes a frequency resonance within the slot antenna 104 due to the capacitive coupling. In some examples, the excitation point 107 may be coupled to one or more of the antenna pattern portion such that the closed end portion of the slot 106 extends on one side of the excitation point 107 and the open end portion of the slot 106 extends on the other side of the excitation point 107.

The slot antenna 104 may be coupled with one or more switches 102 configured to switch the slot 106 and/or antenna pattern portion(s) of the antenna pattern 108, thereby dynamically adjusting the resonant frequency of the slot antenna 104, which adjust the operating frequency of the computing device 100. The switches 102 may be any type of switch configured to switch between two or more configurations such as a first configuration in which the first and second terminals are electrically connected (e.g., short-circuited) and a second configuration in which the first and second terminals are not electrically connected (e.g., open-circuited). The switches 102 may include components such as terminals, and one or more connection members (e.g. to provide the connection or lack thereof between the first and second terminals), as well as any other types of components commonly found in switches.

The switches 102 may include one slot switch 103 or multiple slot switches 103 disposed along a length of the slot 106 at multiple locations. Each slot switch 103 is configured to switch the slot 106 between two or more different configurations. For example, the slot 106 may be disposed between a first terminal and a second terminal of a respective slot switch 103 at particular location along the length of the slot 106. When the slot switch 103 is in the closed position (e.g., creating a closed-circuit), the first terminal is electrically connected to the second terminal (e.g., the slot switch 103 may connect two sides of the slot 106), thereby adjusting the effective length of the slot 106 that is used to create the resonance frequency. For instance, the effective length of the slot 106 may determine the resonant frequency of the slot antenna 104, e.g., the shorter the length, the higher the resonant frequency. When the slot switch 103 is in the open position, a connection is not made between the first terminal and the second terminal, thereby creating an open-circuit.

In some examples, the first terminal of the slot switch 103 is connected to a portion of the conductive frame 101, and the second terminal of the slot switch 103 is connected to a ground contact which may be any portion of the computing device 100 functioning as a ground (e.g., a portion of the conductive frame 101), and the slot 106 is disposed between the first and second terminals. Essentially, the slot switch 103 is configured to connect each side of the slot 106. In some examples, the slot switch 103 is configured to extend across a portion of the slot 106.

In some examples, when two or more slot switches 103 are used, the slot switches 103 may include two classifications of slot switches, e.g., one or more low band slot switches and one or more high band slot switches. The classification of a particular slot switch 103 may depend on its location with respect to the excitation point 107 of the slot antenna 104. For example, one or more slot switches 103 that are disposed over the slot 106 between the excitation point 107 and the closed end portion of the slot 106 may be referred to as the low band switches because they shift the low band resonant frequency of the slot antenna 104. Although the slot switches 103 in some implementations described herein are described as being disposed over the slot 106, the term “over” in this context means that the slot switch 103 crosses the slot 106 when in the closed configuration and therefore the term encompasses a slot switch 103 that is over, under, or to the side of, the slot 106, depending one’s perspective, so long as the switch crosses the slot 106.

One or more slot switches 103 that are disposed over the slot 106 between the excitation point 107 and the open end portion of the slot 106 may be referred to as the high band slot switches because the shift the high band resonance of the slot antenna 104. To increase or decrease the granularity of the frequency bands, the number of slot switches 103 (either low band or high band) may be increased or decreased. In some examples, the slot switches 103 may control the loading of the slot 106 by increasing or decreasing an effective length of the slot 106 that is used to create the resonant frequency of the slot antenna 104. In other words, by increasing or decreasing the length of the slot 106 for creating the resonant frequency, the amount of resonant frequency created within the slot antenna 104 can be increased or decreased, thereby shifting the frequency band.

In some examples, the switches 102 may include one or more antenna switches 105. An antenna switch 105 is configured to switch the antenna pattern 108. For example, with respect to a particular antenna pattern portion, a first terminal of the antenna switch 105 may be connected to the antenna pattern 108 and a second terminal may be connected to a ground contact (e.g., the ground contact may be another portion of the conductive frame 101). The operation of the antenna switch 105 (e.g., moving from the open position to the closed position or vice versa) may shift the resonant frequency produced by the slot antenna 104 by short-circuiting the antenna pattern 108.

Also, the computing device 100 may include a switch controller 110 and a band detector 112. For example, the switch controller 110 may be configured to control the switches 102 (e.g., the slot switch(es) 103 and/or antenna switch(es) 105) such that the slot antenna 104 is dynamically tuned according to a desired frequency or frequency band.

For example, the switch controller 110 may be configured to determine a switch control signal in order to dynamically adjust the configuration (open or closed) of one or more switches 102, thereby adjusting the resonant frequency created in the slot antenna 104 which shifts the operating frequency of the computing device 100. In some examples, the band detector 112 may be configured to determine a current operating condition of the computing device 100, and then control the switches 102 based on the current operating condition such that the slot antenna 104 is tuned to the appropriate frequency/frequency band as indicated by the current operating condition. The current operating condition may be any type of parameter(s) that indicates which frequency/frequency band the computing device should use for wireless communication. In some examples, the current operating condition may be a detected operating frequency or frequency band, the operating channel, the type of wireless carrier, location of the computing device, type of network interface, etc. In some examples, the band detector 112 may detect the computing device's operational frequency or frequency band (e.g., based on information reviewed from a network component such as a modem). Then, the switch controller 110 may be configured to control the switches 102 based on the detected operational frequency or frequency band.

In some examples, the switch controller 110 may control the switches 102 according to switch mapping information 111. The switch mapping information 111 may indicate a plurality of states such as a first state, second state, etc. Each of the states may map the configuration state (ON, OFF) of the switch(es) 102 to a different frequency or frequency band produced by the slot antenna 104. In a non-limiting example, a first state may indicate that a first switch 102 is OFF and a second switch 102 is OFF, which results in operational frequencies of approximately 700 MHz, 800 MHz, and 1700-2100 MHz. A second state may indicate that the first switch 102 is ON and the second switch 102 is OFF, and this results in an operational frequency of approximately 900 MHz. It is noted that the various configuration states of the switches 102 (ON, OFF) and the above-recited frequencies are used for explanatory purposes only, where the switch-based slot antenna may be designed to provide a wide range of frequencies within the various states.

In one example, if the first state is the default state, initially, the switch controller 110 may determine the switch control signal as specified by the first state, and may transmit the switch control signal to the switches 102 which would indicate that both the first and second switches 102 be switched to the OFF state. Accordingly, if the band detector 112 detects that the computing device 100 is operating, or is attempting to operate, in the 900 MHz frequency band, the switch controller 110 may receive this information, and dynamically evaluate whether to adjust the resonant frequency of the slot antenna 104 to be able to operate within the detected frequency. In this example, the switch controller 110 may determine the switch control signal as specified by the second state, and transmit this switch control signal to dynamically switch the the switches 102, which would indicate that the first switch 102 be turned ON (and may indicate that the second switch 102 remain in the OFF state).

Figure 2:
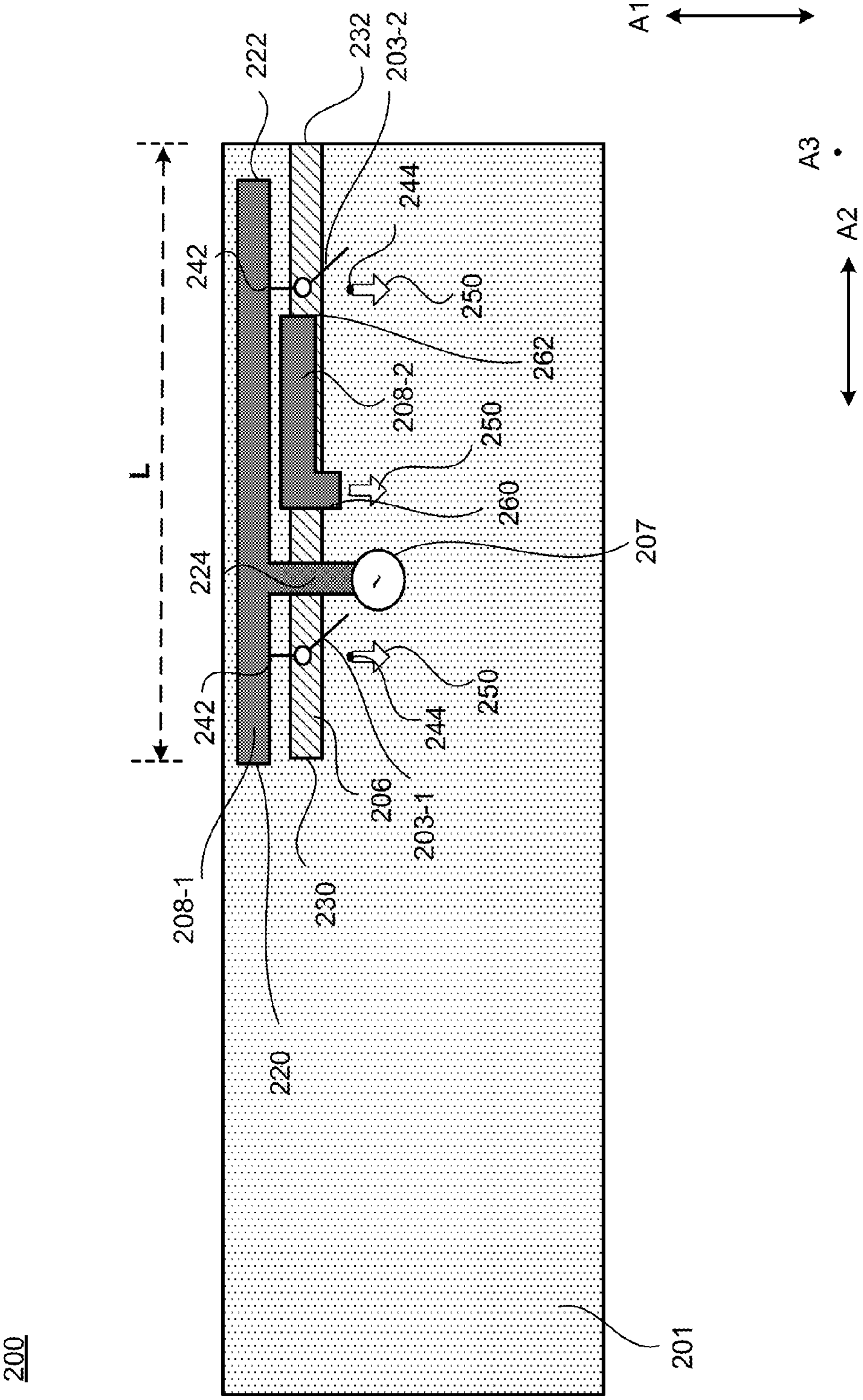
FIG. 2 illustrates a portion of the computing device of FIG. 1 depicting a slot antenna with slot switches according to an embodiment.

FIG. 2 illustrates a portion 200 of the computing device 100 of FIG. 1 depicting a slot antenna (206, 208-1, 208-2) according to the embodiments. The portion 200 of FIG. 2 depicts a conductive frame 201 defining a slot 206 and an antenna pattern 208 that is disposed proximate to the slot 206. Also, FIG. 2 depicts a switching mechanism (e.g., slot switches 203-1, 203-2) that is able to switch the slot 206 at multiple locations, thereby adjusting the frequency or frequency band to various frequencies or frequency band levels. It is noted that although the conductive frame is described as defining the slot, the slot may be defined by any conductive member of the computing device 100.

The slot antenna may include the slot 206 and the antenna pattern 208 having a first antenna pattern portion 208-1 and a second antenna pattern portion 208-2. In some examples, the first antenna pattern portion 208-1 is separate from the second antenna pattern portion 208-2. In other examples, the first antenna pattern portion 208-1 and the second antenna pattern portion 208-2 are constructed from a same antenna pattern structure but form separate portions, arms or branches. Also, in some examples, the first antenna pattern portion 208-1 (or a portion thereof) may contact a portion of the conductive frame 201.

The slot 206 may be a channel or cavity within the conductive frame 201 having a length L extending from an open end portion 232 to a closed end portion 230. In some examples, the slot 106 may be a cut into the conductive frame 201. In this context, the slot 206 may be defined by the conductive frame 201. In some examples, the slot 206 may include an insulator material such as any type of dielectric material. The insulator material may extend through at least a portion of the slot 206 or the slot 206 in its entirety. The open end portion 232 of the slot 206 may define an opening into the conductive frame 201 and the closed end portion 230 of the slot 206 may define the end of the slot 206 within the conductive frame 201. The width and length of the slot 206 may depend on the type of computing device. In some examples, the width of the slot 206 may be less than 2.0 mm. In other examples, the width of the slot 206 may be greater or equal to 2.0 mm. Also, the slot 206 may be one or a combination of different cavity shapes such substantially linear, curved, L-shaped, or spiral-shaped, or generally any type of cavity shape. In addition, the slot 206 may be defined on any portion of the conductive frame 201 as previously discussed with respect to FIG. 1.

The first antenna pattern portion 208-1 may include a conductive material for creating, in conjunction with the slot 206, a first resonant frequency. Generally, the first antenna pattern portion 208-1 may be disposed proximate to the slot 206 such that the first antenna pattern portion 208-1 may be capacitively coupled to the slot 206. In some examples, an intervening isolation layer may be disposed between the first antenna pattern portion 208-1 and the slot 206. In some examples, the first antenna pattern portion 208-1 may be disposed on a different plane than the slot 206 along a direction A3. A direction A3 into the page (shown as a dot) is orthogonal to directions A1 and A2. The directions A1, A2, and A3 are used throughout several of the various views of the implementations described throughout the figures for simplicity.

In some examples, an excitation point 207 may be coupled to the first antenna pattern portion 208-1. The excitation point 107 may be configured to transfer electrical signals (to be transmitted by the slot antenna or received from the slot antenna) between the slot antenna and a transceiving circuitry (e.g., the transceiving circuitry 114 of FIG. 1). For example, the excitation point 107 may be considered the feed point between the transceiving circuitry and the slot antenna. In some examples, the first antenna pattern portion 208-1 may be excited by an electrical signal from the excitation point 107 which then causes the first resonant frequency due to the capacitive coupling. In the example of FIG. 2, the first antenna pattern portion 208-1 may be considered a low band antenna pattern portion (or arm, branch, etc.) that creates a low band resonant frequency within the slot antenna as the first resonant frequency. Generally, the first antenna pattern portion 208-1 may have any type of shape/size such as substantially-straight, L-shaped, spiral-shaped, or generally any type of shape/size. In some examples, the first antenna pattern portion 208-1 may be disposed above (or below) in relation to the slot 206 in the direction A1 which may be in the same or different plane as the slot 206. In addition, as shown in FIG. 2, the first antenna pattern portion 208-1 (or a portion thereof) may overlap with the slot 206 within their respective planes which may be separated by an intervening insolation layer.

In some examples, the first antenna pattern portion 208-1 may include a first end portion 220, and a second end portion 222. The excitation point 207 may be coupled to the first antenna pattern portion 208-1 such that the first end portion 220 is disposed on one side of the excitation point 207 and the second end portion 222 is disposed on another side of the excitation point 207. Also, in some examples, the first antenna pattern portion 208-1 may include a portion 224 that extends over a portion of the slot 206 (e.g., in the direction A1), and the portion 224 of the first antenna pattern portion 208-1 may be coupled to the excitation point 207, as shown in FIG. 2.

The second antenna pattern portion 208-2 may include a conductive material for creating, in conjunction with the slot 206, a second resonant frequency. In some examples, the second resonant frequency may be higher than the first resonant frequency created by the first antenna pattern portion 208-1. Generally, the second antenna pattern portion 208-2 may be disposed proximate to the slot 206 such that the second antenna pattern portion 208-2 may be capacitively coupled to the slot 206. In some examples, an intervening isolation layer being composed of dielectric material may be disposed between the second antenna pattern portion 208-2 and the slot 206. In some examples, the second antenna pattern portion 208-2 may be disposed on a different plane than the slot 206 in the direction A3. Further, the second antenna pattern portion 208-2 may be disposed on a different plane than the slot 206 and the first antenna pattern portion 208-1 such that the first antenna pattern portion 208-1, the second antenna pattern portion 208-2, and the slot 206 are each disposed within different planes along the direction A3.

In some examples, the second antenna pattern portion 208-1 may be considered a high band antenna pattern portion (or arm, branch, etc.) that creates the second resonant frequency due to the capacitive coupling between the slot 206 and the second antenna pattern portion 208-1 when electrical signals are transferred to the slot antenna via the excitation point 207. Generally, the second antenna pattern portion 208-2 may have any type of shape/size such as substantially-straight, L-shaped, spiral-shaped, or generally any type of shape/size. In some examples, the second antenna pattern portion 208-2 may be disposed above or below in relation to the slot 206 which may be in the same or different plane as the slot 206. Also, as shown in FIG. 2, portions of the second antenna pattern portion 208-2 may overlap with the slot 206 in a different plane as the slot 206 in the A3 direction.

In some examples, the second antenna pattern portion 208-2 may include a first end portion 260, and a second end portion 262. In some examples, the second antenna pattern portion 208-2 may be disposed between the excitation point 207 and the open end portion 232 of the slot 206 such that the first end portion 260 and the second end portion 262 of the second antenna pattern portion 208-2 are disposed between the excitation point 207 and the open end portion 232 of the slot 206.

In some examples, the slot antenna of FIG. 2 may be coupled with one or more slot switches 203 configured to switch the slot 206, thereby adjusting the resonant frequency (high and low band resonant frequency) of the slot antenna which adjusts the frequency band of the computing device. As shown in FIG. 2, a first switch 203-1 is disposed over a portion of the slot 206 such that the first switch 203-1 is configured to switch the slot 206 (e.g., connecting and disconnecting two sides of the slot 206). For example, the slot 206 may be disposed between a first terminal 242 and a second terminal 244 of the first slot switch 203-1. In some examples, the first slot switch 203-1 is disposed over the slot 206 at a location on the slot 206 between the excitation point 207 and the closed end portion 230 of the slot 206. As such, the first slot switch 203-1 may be considered a low band switch because it shifts the low band resonance of the slot 106.

In some examples, the first terminal 242 may be coupled to a portion of the conductive frame 201 at a location between the first end portion 220 and the portion of the first antenna pattern 208-1 that is coupled to the excitation point 207. For example, the first terminal 242 of the first slot switch 203-1 may be coupled to the conductive frame 201 in the manner shown in FIG. 2, and the second terminal 244 of the first slot switch 203-1 may be coupled to a ground contact 250. The ground contact 250 may be any portion of the computing device that can function as a ground connection point including other portions of the conductive frame 201. Alternatively, the first terminal 242 of the first slot switch 203-1 may be coupled to another portion of the computing device. In general, the first slot switch 203-1 may be disposed over the slot 206 with terminals connecting to any conductive portions of the computing device. In other words, the first slot switch 203-1 (or any slot switch 203) may electrically connect two sides of the slot 206 at a particular location along the length of the slot 206 when in the closed configuration.

When the first slot switch 203-1 is in the closed position, the first terminal 242 is electrically connected to the second terminal 244, thereby adjusting the effective length of slot 206 that is used to create the resonant frequency. For example, the effective length of the slot 206 may be reduced to a length extending from the first slot switch 203-1 and the open end portion 232 of the slot 206 (e.g., with the portion of the slot 206 extending between the first slot switch 203-1 and the closed end portion 230 of the slot 206 being short-circuited). When the slot switch 203-1 is in the open position, a connection is not made between the first terminal 242 and the second terminal 244. Also, in some examples, more than one slot switch 203 is disposed along the slot 206 (at distances from each other) between the excitation point 207 and the closed end portion 230 of the slot 206.

As shown in FIG. 2, a second slot switch 203-2 is disposed over a portion of the slot 206 such that the second slot switch 203-2 is configured to switch the slot 206. For example, the slot 106 may be disposed between a first terminal 242 and a second terminal 244 of the second slot switch 203-2. In some examples, the second slot switch 203-2 is disposed over the slot 206 between a location on the slot 206 between the excitation point 207 and the open end portion 232 of the slot 206. As such, the first slot switch 203-1 may be considered a high band switch because it shifts the high band resonant frequency. Also, in relation to the second antenna arm portion 208-2, the second slot switch 203-2 may be disposed over the slot 106 between the second end portion 262 of the second antenna arm portion 208-2 and the open end portion of the slot 206.

In some examples, the first terminal 242 of the second slot switch 203-2 may be coupled to a portion of the conductive frame 201 on one side of the slot 206 (e.g., at a location between the portion of the first antenna pattern 208-1 that is coupled to the excitation point 207 (e.g., portion 224) and the second end portion 222 of the first antenna pattern 208-1). In some examples, the first terminal 242 of the second slot switch 203-2 may be coupled to a portion of the conductive frame 201 on one side of the slot 206 at a location between the second end portion 262 of the second antenna pattern portion 208-2 and the open end portion 232 of the slot 206. As shown, the second terminal 244 of the second slot switch 203-2 may be coupled to the ground contact 250. However, in a general implementation, the second slot switch 203-2 may be disposed over the slot 206 with terminals connecting to any conductive portions of the computing device.

In some examples, the operation of the second slot switch 203-2 has a relatively different effect on the slot 206 as compared with the first slot switch 203-1. When the second slot switch 203-2 is in the closed position, the first terminal 242 is electrically connected to the second terminal 244 of the second slot switch 203-2, thereby closing the slot 206 (e.g., the slot 206 is closed by the closed end portion of the slot 206 and the closed second slot switch 203-2) which increases the resonant frequency of the antenna. In some examples, the second slot switch 203-2 is configured to increase the resonant frequency more than the increased resonant frequency that is created by closing of the first slot switch 203-1. When the slot switch 203-1 is in the open position, a connection is not made between the first terminal 242 and the second terminal 244 of the second slot switch 203-2, thereby allowing the signals to resonate though the open second slot switch 203-2. Also, in some examples, more than one slot switch 203 can be disposed along the slot 206 (at distances from each other) between the excitation point 207 (and/or the second end portion of the second antenna pattern portion 208-2) and the open end portion 232 of the slot 206.

Referring to FIGS. 1 and 2, the switch controller 110 may be configured to control operation of the first slot switch 203-1 and the second slot switch 203-2. For example, the switch controller 110 may be configured to control the first and second slot switches 203 such that the slot antenna of FIG. 2 is tuned according to a desired frequency or frequency band. For example, the switch controller 110 may be configured to determine a switch control signal in order to dynamically adjust the state (open or closed) of the first and second slot switches 203, thereby adjusting the resonant frequency created in the slot antenna which shifts the operating frequency band of the computing device 100. In some examples, the band detector 112 may be configured to determine the computing device's operational frequency band (e.g., based on information reviewed from a network component such as a modem). Then, the switch controller 110 may be configured to control the first and second slot switches 203 based on the detected operational frequency band.

In some examples, the switch controller 110 may control the first and second slot switches 203 according to the switch mapping information 111. Generally, the switch mapping information 111 may indicate a plurality of states such as a first state, second state, etc. Each of the states may map the configuration states (e.g., ON, OFF) of the slot switch(es) 203 to the frequency or frequency band that result from having the switch(es) in their respective configuration state. A non-limiting example of the different states of the antenna is provided below in Table 1.

TABLE 1

| States | First Slot Switch 203-1 | Second Slot Switch 203-2 | Frequency Band (MHz) |
|---|---|---|---|
| State 1 (Default) | OFF | OFF | 700, 800, 1700-2100 |
| State 2 | ON | OFF | 900 |
| State 3 | OFF | ON | 2600 |

It is noted that the specific values of the frequency bands and the configuration states of the slot switches 203 (OFF, ON) are used for explanatory purposes only, where the embodiments encompass any type of values for the switch mapping information 111. In one example, if the first state is the default state, initially, the switch controller 110 may determine the switch control signal according as specified by the first state, and transmit the switch control signal to the first and second slot switches 203 which would indicate that both the first and second slot switches 203 be switched to the OFF state. Accordingly, if the band detector 112 detects that the computing device 100 is operating in the 900 MHz frequency band, the switch controller 110 may receive this information, and evaluate whether to adjust the resonant frequency of the slot antenna to be able to operate within the detected frequency band. In this example, the switch controller 110 may determine the switch control signal as specified by the second state, and transmit this switch control signal to the first and second slot switches 203 which would indicate that the first slot switch 203-1 be turned ON (and may indicate that the second slot switch 203-2 remain in the OFF state). Then, at a later point, if the band detector 112 detects that the computing device 100 is operating in the 2600 MHz frequency band, the switch controller 110 may receive this information, and evaluate whether to adjust the resonant frequency of the slot antenna to be able to operate within the detected frequency band. In this example, the switch controller 110 may determine the switch control signal as specified by the third state, and transmit this switch control to the first and second slot switches 203 which would indicate that the first slot switch 203-1 be turned OFF and the second slot switch 203-1 be turn ON.

Figure 3:
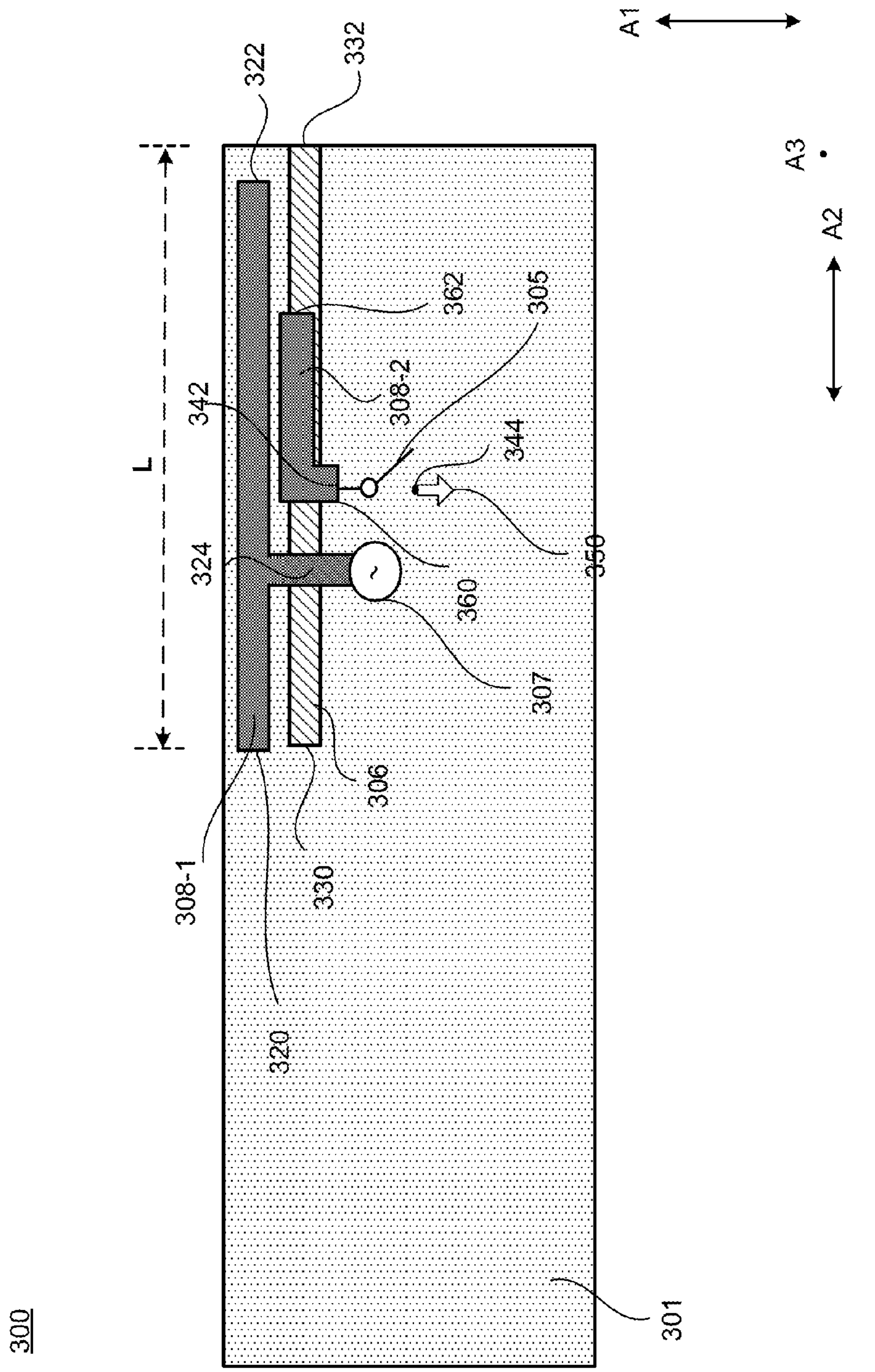
FIG. 3 illustrates a portion of the computing device of FIG. 1 depicting a slot antenna within at least one antenna switch according to an embodiment.

FIG. 3 illustrates a portion 300 of the computing device 100 of FIG. 1 depicting a slot antenna according to the embodiments. The portion 300 of FIG. 3 depicts a conductive frame 301 defining (at least in part) a slot antenna, and an excitation point 307. FIG. 3 depicts a switching mechanism that is able to switch the antenna pattern of the slot antenna between two different configurations (e.g., as opposed to the implementation of FIG. 2 which switches the slot between different configurations). The slot antenna of FIG. 3 may include a slot 306 having a length L extending from an open end portion 332 to a closed end portion 330 and an antenna pattern 308 having a first antenna pattern portion 308-1 and a second antenna pattern portion 308-2. Similar to FIG. 2, the first antenna pattern portion 308-1 may include a first end portion 320, a second end portion 322, and a portion 324 coupled to the excitation point 307. The second antenna pattern portion 308-2 may include a first end portion 360 and a second end portion 362. The slot 306, the antenna pattern 308, and the excitation point 307 may be similar to the slot 206, the antenna pattern 208, and the excitation point 207 of FIG. 2, and therefore the details (and variations) of these components (as well as the arrangement of these components with respect to each other) are omitted for the sake of brevity.

In FIG. 3, instead of using slot switches over the slot 306, an antenna switch 305 is utilized to effectively switch the second antenna pattern portion 308-2. In some examples, the second antenna pattern portion 308-2 may be considered a parasitic arm that may control the resonant frequency of the slot antenna of FIG. 3. In some examples, the antenna switch 305 may be coupled to the second antenna pattern portion 308-2. For example, a first terminal 342 of the antenna switch 305 may be coupled to a portion of the second antenna pattern portion 308-2. In some examples, the first terminal 342 of the antenna switch 305 may be coupled to the second antenna pattern portion 308-2 at a location on the second antenna pattern portion 308-2 disposed between the excitation point 307 and the open end portion 332 of the slot 306. In some examples, the first terminal 342 of the antenna switch 305 may be coupled to the second antenna pattern portion 308-2 at a location on the second antenna pattern portion 308-2 between the first end portion 320 of the first antenna pattern portion 308-1 and the second end portion 322 of the first antenna pattern portion 308-2. In some examples, the first terminal of the antenna switch 305 may be coupled to the first end portion 360 of the second antenna pattern portion 308-2. In some examples, a second terminal 344 of the antenna switch 305 may be coupled to a ground contact 350 which may be any portion of the computing device functionally as a ground contact point such as the conductive frame 301.

Referring to FIGS. 1 and 3, the switch controller 110 may be configured to control operation of the antenna switch 305. For example, the switch controller 110 may be configured to control the antenna switch 305 such that the slot antenna of FIG. 3 is tuned according to a desired frequency band. For example, the switch controller 110 may be configured to determine a switch control signal in order to dynamically adjust the state (open or closed) of the antenna switch 305, thereby adjusting the resonant frequency of the antenna, which shifts the operating frequency band of the computing device 100. In some examples, the band detector 112 may be configured to determine the computing device's operational frequency band (e.g., based on information reviewed from a network component such as a modem). Then, the switch controller 110 may be configured to control the antenna switch 305 based on the detected operational frequency band.

In some examples, the switch controller 110 may control the antenna switch 305 according to the switch mapping information 111. Generally, the switch mapping information 111 may indicate a plurality of states such as a first state, second state, etc. Each of the states may map the configuration state of the antenna switch 305 to the frequency band that results from having the switch(s) in their respective operational state. A non-limiting example of the different states of the antenna is provided below in Table 2.

TABLE 2

| States | Antenna Switch 305 | Frequency Band (MHZ) |
|---|---|---|
| State 1 (Default) | ON | 800, 900, 1700-2100 |
| State 2 | OFF | 900, 2600 |

In one example, if the first state is the default state, initially, the switch controller 110 may determine the switch control signal according as specified by the first state, and transmit the switch control signal to the antenna switch 305 which would indicate that the antenna switch 305 be switched to the ON state. Accordingly, if the band detector 112 detects that the computing device 100 is operating in the 900 MHz/2600 MHz frequency bands, the switch controller 110 may receive this information, and evaluate whether to adjust the resonant frequency to be able to operate within the detected frequency band. In this example, the switch controller 110 may determine the switch control signal as specified by the second state, and transmit this switch control signal to the antenna switch 305 which would indicate that the antenna switch 305 be turned OFF.

Figure 4:
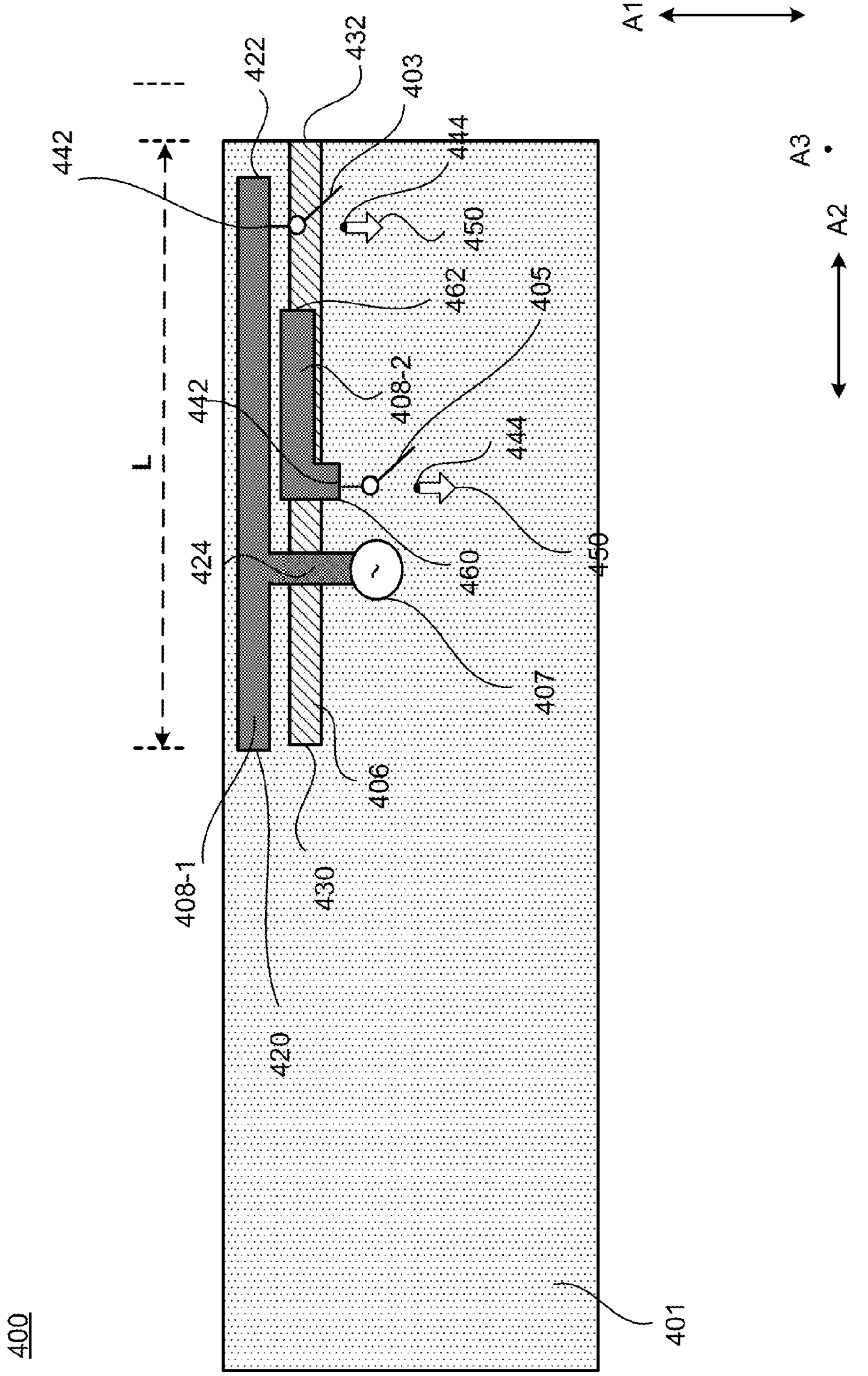
FIG. 4 illustrates a portion of the computing device of FIG. 1 depicting a slot antenna within a combination of a slot switch and an antenna switch according to an embodiment.

FIG. 4 illustrates a portion 400 of the computing device 100 of FIG. 1 depicting a slot antenna according to the embodiments. The portion 400 of FIG. 4 depicts a conductive frame 401 defining (at least in part) a slot antenna, and an excitation point 707. Generally, FIG. 4 depicts a switching mechanism that is able to switch both the antenna pattern 408 and the slot 406 of the slot antenna (e.g., a combination of slot switches and antenna switches). The slot antenna of FIG. 4 may include a slot 406 having a length L extending from an open end portion 432 to a closed end portion 430 and an antenna pattern 408 having a first antenna pattern portion 408-1 and a second antenna pattern portion 408-2. Similar to FIGS. 2 and 3, the first antenna pattern portion 408-1 may include a first end portion 420, a second end portion 422, and a portion 424 coupled to the excitation point 407. The second antenna pattern portion 408-2 may include a first end portion 460 and a second end portion 462. The slot 406, the antenna pattern 408, and the excitation point 407 may be similar to the components described with reference to FIGS. 2 and 3, and therefore the details (and variations) of these components (as well as the arrangement of these components with respect to each other) are omitted for the sake of brevity.

Similar to FIG. 3, an antenna switch 405 is utilized to effectively switch the second antenna pattern portion 408-2. In some examples, the second antenna pattern portion 408-2 may be considered a parasitic arm that may control the resonant frequency of the slot antenna of FIG. 4. In some examples, the antenna switch 405 may be coupled to the second antenna pattern portion 408-2 in a manner previously described with reference to FIG. 3.

In the example of FIG. 4, in addition to the antenna switch 405, a slot switch 403 is disposed over the slot 406 in order to switch the slot 406. In some examples, the slot switch 403 is similar to the second slot switch 304-2 described with reference to FIG. 3. As shown in FIG. 4, the slot switch 403 is disposed over a portion of the slot 406 such that the slot switch 403 is configured to switch the slot 406. For example, the slot 406 may be disposed between a first terminal 442 and a second terminal 444 of the slot switch 403. In some examples, the slot switch 403 is disposed over the slot 206 at a location on the slot 406 between the excitation point 407 and the open end portion 432 of the slot 406. Also, in relation to the second antenna arm portion 408-2, the slot switch 403 may be disposed over the slot 406 at a location on the slot 406 between the second end portion 462 of the second antenna arm portion 408-2 and the open end portion 432 of the slot 406.

In some examples, the slot switch 403 may connect two sides of the slot 406 (e.g., the first terminal 442 of the slot switch 403 may be coupled to one side of the slot and/or a portion of the conductive frame 401 at a location between the portion of the first antenna pattern 408-1 that is coupled to the excitation point 407 (e.g., portion 424) and the second end portion 422 of the first antenna pattern 408-1). In some examples, the first terminal 442 of the slot switch 403 may be disposed at a location between the second end portion 462 of the second antenna pattern portion 408-2 and the open end portion 432 of the slot 406. As shown, the second terminal 444 of the slot switch 403 may be coupled to the ground contact 450. Alternatively, the first terminal 442 of the slot switch 403 may be coupled to another portion of the computing device. However, in a general implementation, the slot switch 403 may be disposed over the slot 406 with terminals connecting to any conductive portions of the computing device.

Referring to FIGS. 1 and 4, the switch controller 110 may be configured to control operation of the antenna switch 405 and the slot switch 403. For example, the switch controller 110 may be configured to control the antenna switch 405 and the slot switch 403 such that the slot antenna of FIG. 4 is tuned according to a desired frequency or frequency band. For example, the switch controller 110 may be configured to determine a switch control signal in order to dynamically adjust the configuration states (open or closed) of the antenna switch 405 and the slot switch 403, thereby adjusting the resonant frequency which shifts the operating frequency band of the computing device 100. In some examples, the band detector 112 may be configured to determine the computing device's operational frequency band (e.g., based on information reviewed from a network component such as a modem). Then, the switch controller 110 may be configured to control the antenna switch 405 and the slot switch 403 based on the detected operational frequency band.

In some examples, the switch controller 110 may control the antenna switch 405 and the slot switch 403 according to the switch mapping information 111. Generally, the switch mapping information 111 may indicate a plurality of states such as a first state, second state, etc. Each of the states may map the configuration state of the antenna switch 405 and the slot switch 403 to the frequency band that results from having the switch(s) in their respective operational state. A non-limiting example of the different states of the slot antenna is provided below in Table 3.

TABLE 3

| States | Antenna Switch 405 | Slot Switch 403 | Frequency Band (MHZ) |
|---|---|---|---|
| State 1 (Default) | ON | OFF | 700, 800 (low), 1700-2100 |
| State 2 | OFF | OFF | 800 (high), 900 |
| State 3 | ON | ON | 2600 |

In one example, if the first state is the default state, initially, the switch controller 110 may determine the switch control signal according as specified by the first state, and transmit the switch control signal to the antenna switch 405 and the slot switch 403 which would indicate that the antenna switch 405 be switched to the ON state and the slot switch 403 be switched to the OFF state. Accordingly, if the band detector 112 detects that the computing device 100 is operating in the frequency band corresponding to the second state (e.g., 700, 800 (low), 1700-2100), the switch controller 110 may receive this information, and evaluate whether to adjust the resonant frequency to be able to operate within the detected frequency band. In this example, the switch controller 110 may determine the switch control signal as specified by the second state, and transmit this switch control signal to the antenna switch 405 and the slot switch 403, which would indicate that the antenna switch 405 should be turned OFF and the slot switch 403 be turned OFF. Then, at a later point, if the band detector 112 detects that the computing device 100 is operating in the 2600 MHz frequency band, the switch controller 110 may receive this information, and evaluate whether to adjust the resonant frequency to be able to operate within the detected frequency band. In this example, the switch controller 110 may determine the switch control signal as specified by the third state, and transmit this switch control to the antenna switch 405 and the slot switch 403 in a manner indicated by the switch mapping information 111.

Figure 5:
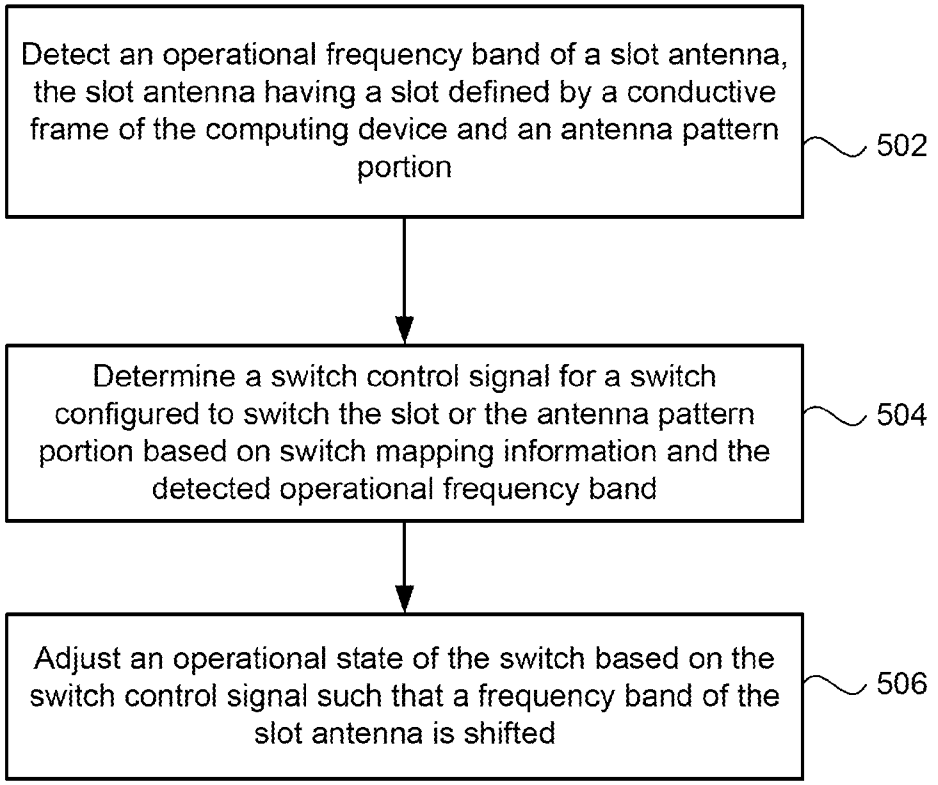
FIG. 5 illustrates a flowchart depicting example operating for adjusting the frequency band of the computing device according to any of the configurations described with reference to FIGS. 1-4 according to an embodiment.

FIG. 5 illustrates a flowchart depicting example operating for adjusting the frequency band of a slot antenna of any of FIGS. 1-4 according to an embodiment. Although the flowchart of FIG. 5 illustrates the operations in sequential order, it will be appreciated that this is merely an example, and that additional or alternative operations may be included. Further, operations of FIG. 5 and related operations may be executed in a different order than that shown, or in a parallel or overlapping fashion.

An operational frequency or frequency band of a slot antenna may be detected, where the slot antenna has a slot defined by a conductive frame of the computing device and an antenna pattern portion (502). For example, the band detector 112 of FIG. 1 may be configured to determine the operational frequency band based on information reviewed from a network component.

A switch control signal for a switch configured to switch the slot or the antenna pattern portion may be determined based on switch mapping information and the detected operational frequency band (504). For example, the switch controller 110 of FIG. 1 may be configured to control the switch such that the slot antenna is dynamically tuned according to a desired frequency or frequency band. The switch may be any of the switches described with reference to FIGS. 1-4. In addition, the switch may be a plurality of switches arranged in a manner as described with reference to FIGS. 1 and 3-4. In some examples, the switch controller 110 may control the switch 102 according to the switch mapping information 111 and the detected operational frequency band. For example, the switch mapping information 111 may indicate a plurality of states such as a first state, second state, etc. Each of the states may map the configuration state (ON, OFF) of the switch to a different frequency or frequency band produced by the slot antenna 104. Examples of the switch mapping information 111 are provided with respect to Table 1, Table 2, and Table 3 described above. As such, the switch controller 110 may determine which of the states (e.g., first state, second state, etc.) corresponds to the detected operational frequency or frequency band, and then determine the corresponding commands for the switch as dictated by the switch mapping information 111.

An operational state of the switch may be adjusted based on the switch control signal such that a frequency band of the slot antenna is shifted (506). For example, the switch controller 110 may be configured to transmit the switch control signal to the switch. Then, the switch may adjust its operational state based on the switch control signal. For example, the switch may dynamically adjust its state (open or closed) according to the switch control signal, thereby adjusting the resonant frequency created in the slot antenna which shifts the frequency band of the computing device. For example, the switch may control the loading of the slot by increasing or decreasing an effective length of the slot that is used to create the resonant frequency of the slot antenna. By increasing or decreasing the effective length of the slot, the resonant frequency created by the slot antenna can be increased or decreased, thereby shifting the frequency band. Furthermore, the switch may control the loading of the slot by switching the antenna pattern (e.g., short-circuiting the slot) which may then substantially increase the resonant frequency, thereby shifting the frequency band.

Thus, various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims. Also, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "receiving", or "processing" or "computing" or "calculating" or "determining" or "displaying" or "providing", or "partitioning", or "constructing", or "selecting", or "comparing" or the like, refer to the action and processes of a computer system, or similar electronic computing device, that manipulates and transforms data represented as physical (electronic) quantities within the computer system memories or registers or other such information storage, transmission or display devices.

It will be appreciated that the above embodiments that have been described in particular detail are merely example or possible embodiments, and that there are many other combinations, additions, or alternatives that may be included.

What is claimed is:

1. A computing device comprising:

a conductive member;

a slot antenna including a slot defined by the conductive member, and an antenna pattern portion disposed proximate to the slot;

an excitation point configured to transfer wireless signals between the slot antenna and a transceiver circuitry of the computing device, the excitation point being coupled to a portion of the antenna pattern portion;

a first slot switch configured to switch a first portion of the slot, the first slot switch having a first terminal and a second terminal such that the first portion of the slot is disposed between the first terminal and the second terminal, the first slot switch being switchable between a first configuration in which the first and second terminals are electrically connected and a second configuration in which the first and second terminals are not electrically connected;

a second slot switch configured to switch a second portion of the slot, the excitation point being disposed between the first slot switch and the second slot switch; and a switching controller configured to switch the first slot switch between the first and second configurations and switch the second slot switch.

2. The computing device of claim 1, further comprising:

wherein the first slot switch is disposed across the first portion of the slot at a location along the slot between a closed end of the slot and the excitation point, the first terminal of the first slot switch being coupled to a portion of the conductive member.

3. The computing device of claim 1, wherein the second slot switch has a first terminal and a second terminal such that the second portion of the slot is disposed between the first terminal of the second slot switch and the second terminal of the second slot switch, the second slot switch being switchable between a first configuration in which the first and second terminals of the second slot switch are electrically connected and a second configuration in which the first and second terminals of the second slot switch are not electrically connected, the first terminal of the second slot switch being coupled to a portion of the conductive member.

4. The computing device of claim 1, wherein the second slot switch is disposed across the second portion of the slot at a location along the slot between an open end of the slot and the excitation point.

5. The computing device of claim 1, further comprising:

a band detector configured to detect an operating frequency of the computing device, wherein the switching controller is configured to tune the slot antenna to the detected operating frequency by determining and transmitting switch control signals to the first slot switch and the second slot switch, wherein the switch control signals causes the first slot switch and the second slot switch to switch their configurations.

6. The computing device of claim 1, wherein the switching controller is configured to control the operation of the first slot switch and the second slot switch based on switch mapping information, the switch mapping information indicating a plurality of states, and for each state, mapping at least one frequency to a configuration of the first slot switch and the second slot switch.

7. A computing device comprising:

a conductive member;

a slot antenna including a slot defined by the conductive member, a first antenna pattern portion, and a second antenna pattern portion, the slot having an open end and a closed end;

an excitation point configured to transfer wireless signals between the slot antenna and a transceiver circuitry of the computing device, the excitation point being coupled to a portion of the first antenna pattern portion;

a first switch configured to switch a first portion of the slot that is disposed between the closed end of the slot and the excitation point, the first switch being switchable between a first configuration in which first and second terminals of the first switch are electrically connected and a second configuration in which the first and second terminals of the first switch are not electrically connected; and a second switch configured to switch a second portion of the slot that is disposed between the open end of the slot and the excitation point, the second switch being switchable between a first configuration in which first and second terminals of the second switch are electrically connected and a second configuration in which the first and second terminals of the second switch are not electrically connected; and a switching controller configured to switch the first switch between the first and second configurations of the first switch, the switching controller configured to switch the second switch between the first and second configurations of the second switch.

8. The computing device of claim 7, wherein the first antenna pattern portion includes a first portion, a second portion, and a third portion, the third portion being the portion of the first antenna pattern portion that is coupled to the excitation point.

9. The computing device of claim 8, wherein the first portion of the first antenna pattern portion and the second portion of the first antenna pattern portion are linearly disposed with respect to each other, the third portion of the first antenna pattern portion extending in a direction orthogonal to the first portion of the first antenna pattern portion.

10. The computing device of claim 8, wherein the first terminal of the first switch is coupled to the first portion of the first antenna pattern portion, and the first terminal of the second switch is coupled to the second portion of the first antenna pattern portion.

11. The computing device of claim 7, wherein the second antenna pattern portion is disposed in a different plane than the slot.

12. The computing device of claim 7, wherein the first switch and the second switch are disposed on opposite sides of the excitation point.

13. The computing device of claim 7, further comprising:

a band detector configured to detect an operating frequency of the computing device, wherein the switching controller is configured to tune the slot antenna to the detected operating frequency by determining and transmitting switch control signals to the first and second switches, wherein the switch control signals cause the first and second switches to switch to their first configuration or the second configuration.

14. The computing device of claim 7, wherein the switching controller is configured to control the operation of the first and second switches based on switch mapping information, the switch mapping information indicating a plurality of states, and for each state, mapping at least one frequency to a configuration of the first and second switches.

* * * * *